(12) United States Patent
Chira et al.

(10) Patent No.: US 8,651,154 B1
(45) Date of Patent: Feb. 18, 2014

(54) TIRE TRACTION DEVICE

(76) Inventors: Narcis Chira, Chicago, IL (US);
Monica Chira, Chicago, IL (US)

( * ) Notice: Subject to any disclaimer, the term of this patent is extended or adjusted under 35 U.S.C. 154(b) by 198 days.

(21) Appl. No.: 13/098,556

(22) Filed: May 2, 2011

(51) Int. Cl.
*B60C 27/04* (2006.01)

(52) U.S. Cl.
USPC ......................................................... 152/221

(58) Field of Classification Search
USPC .......... 152/213 R, 217, 218, 222, 225 R, 226, 152/229, 230, 239, 241; 305/19
See application file for complete search history.

(56) References Cited

U.S. PATENT DOCUMENTS

| | | | | |
|---|---|---|---|---|
| 2,341,317 A | * | 2/1944 | Faulds | 152/222 |
| 2,570,689 A | * | 10/1951 | Kennedy | 152/222 |
| 2,685,903 A | * | 8/1954 | Lutey | 152/222 |
| 3,007,506 A | | 11/1961 | Bowler | |
| 4,334,569 A | * | 6/1982 | Jacob et al. | 152/221 |
| 4,355,451 A | * | 10/1982 | Thomas | 29/426.6 |
| 4,919,182 A | | 4/1990 | Proulx et al. | |
| 5,624,509 A | | 4/1997 | Stanley | |
| 6,016,856 A | * | 1/2000 | Hynes | 152/190 |
| 6,517,173 B1 | * | 2/2003 | Oberlander et al. | 305/180 |
| 6,536,491 B2 | | 3/2003 | Martinez | |
| 2009/0145530 A1 | * | 6/2009 | Lammon | 152/226 |

* cited by examiner

*Primary Examiner* — S. Joseph Morano
*Assistant Examiner* — Jean Charleston

(57) ABSTRACT

A tire traction device installable on a vehicle tire tread surface, including a parallelepiped strip of a polymeric material, the strip having a protruding tread in a repeat pattern across an exterior surface, each strip having an interlocking hinge at the strip front and rear end by which the strip connects to other such strips by means of an insertable pin, the strip secured to the vehicle wheel by means of an adjustable belt member, the belt member having a buckle piece and a thread piece, secured around the vehicle wheel rim by means of a fastener.

8 Claims, 5 Drawing Sheets

TIRE TRACTION DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of tire traction devices are known in the prior art. However, what is needed is a tire traction device that includes inter-attachable strips secured to the exterior circumference of a tire with belts extended through the wheel rim, the strips secured together by means of insertable pins, the pins inserted laterally into interlocking hinges.

FIELD OF THE INVENTION

The present invention relates to a tire traction device, and more particularly, to a tire traction device with inter-attachable strips secured to the exterior circumference of a tire, atop the tire tread, with belts extended through the wheel rim, each inter-attachable strip secured together by means of insertable pins, which pins are inserted into interlocking hinges disposed at the ends of each strip. The tire traction device has protruding tread on the surface of each inter-attachable strip, thereby greatly increasing traction on ice and snow as desired.

SUMMARY OF THE INVENTION

The general purpose of the present tire traction device, described subsequently in greater detail, is to provide a tire traction device which has many novel features that result in a tire traction device which is not anticipated, rendered obvious, suggested, or even implied by prior art, either alone or in combination thereof.

Many motorists know the peril of driving on icy or snowy roads when traction is greatly diminished. Stopping distance is generally increased more than six-fold, and handling the vehicle around corners or along slopes can be tricky. Many a motorist has lost control of their vehicle and slid off the road, sometimes causing injury to themselves or others. Further, many motorists have found themselves trapped in snowy or icy conditions, their vehicles useless with wheels spinning unable to gain purchase against a slick road surface.

While snow tires are a prudent investment, they remain expensive and wear faster than normal tires. In many instances, snow tires are not warranted as drivers are only passing through severe winter weather en route to another destination. Often, travelers are caught in unexpected severe wintry conditions, and may not have snow tires presently installed on their vehicles. Chains and other devices evident in the prior art attempt to increase traction on such road surfaces when installed over a vehicle's tires and thus limit such accidents and injuries. However, chains can be cumbersome, noisy, unwieldy, and difficult to install—especially in the midst of a winter storm when they are needed most. Further, the driver's speed is greatly impacted by the use of chains, and tire wear is increased when using chains.

What is needed is a tire traction device that is easily installed over a tire when needed, securely attached thereto, while offering the motorist the necessary traction to navigate icy and snowy roads without fear of losing control of the vehicle at speeds generally faster than are possible when using chains. Furthermore, such a device should be devised to minimize wear on the tires when used, and be rapidly removable and easily stored when no longer needed. Wherein we have made new and useful improvements to a tire traction device realizing the abovementioned needs.

The present tire traction device has been devised to provide ready traction in such instances when the road surface is obscured by ice and snow, and yet easily installable. Further, the present invention has been devised to snugly conform to a tire surface, lessening tire wear when used, and enabling travel at a higher speed over such wintry road conditions, as desired by the driver.

The present tire traction device consists of inter-attachable strips, each strip the approximate width of a tire upon which it is to be installed. Each strip is a section of a flattened polymeric material having protruding tread on the exterior surface. The strips are attached together by means of insertable pins. The pins are inserted through interlocking hinges connectable at the ends of each tire traction strip. These hinges, once interlocked with the insertable pin, secure each strip together forming a continuous circular tread on the exterior of the tire. Each strip is further secured to each tire by means of a belt, the belt threaded through the wheel rim, extending from the side of the tire traction strip down the tire sidewalls over the wheel flange, to then pass through the wheel rim and connect with its opposing member. Each belt is then tightened as desired until a snug and secure fit is attained. The belt is fastened taut by means of a fastener.

The present device has been configured to come in different widths and strip sizes, thereby conforming to the variety of vehicle wheel and tire sizes common in today's market. The device has been devised to be adaptable for cars, pick-up trucks, and even larger, commercial vehicles such as buses and trucks.

The present tire traction device is thereby easily installed over any vehicle's tires when needed and provides a convenient and accessible means for increasing any vehicle's traction in poor road conditions without the owner of the vehicle having to purchase and install new tires.

Thus has been broadly outlined the more important features of the present tire traction device so that the detailed description thereof that follows may be better understood and in order that the present contribution to the art may be better appreciated.

Objects of the present tire traction device, along with various novel features that characterize the invention are particularly pointed out in the claims forming a part of this disclosure. For better understanding of the tire traction device, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
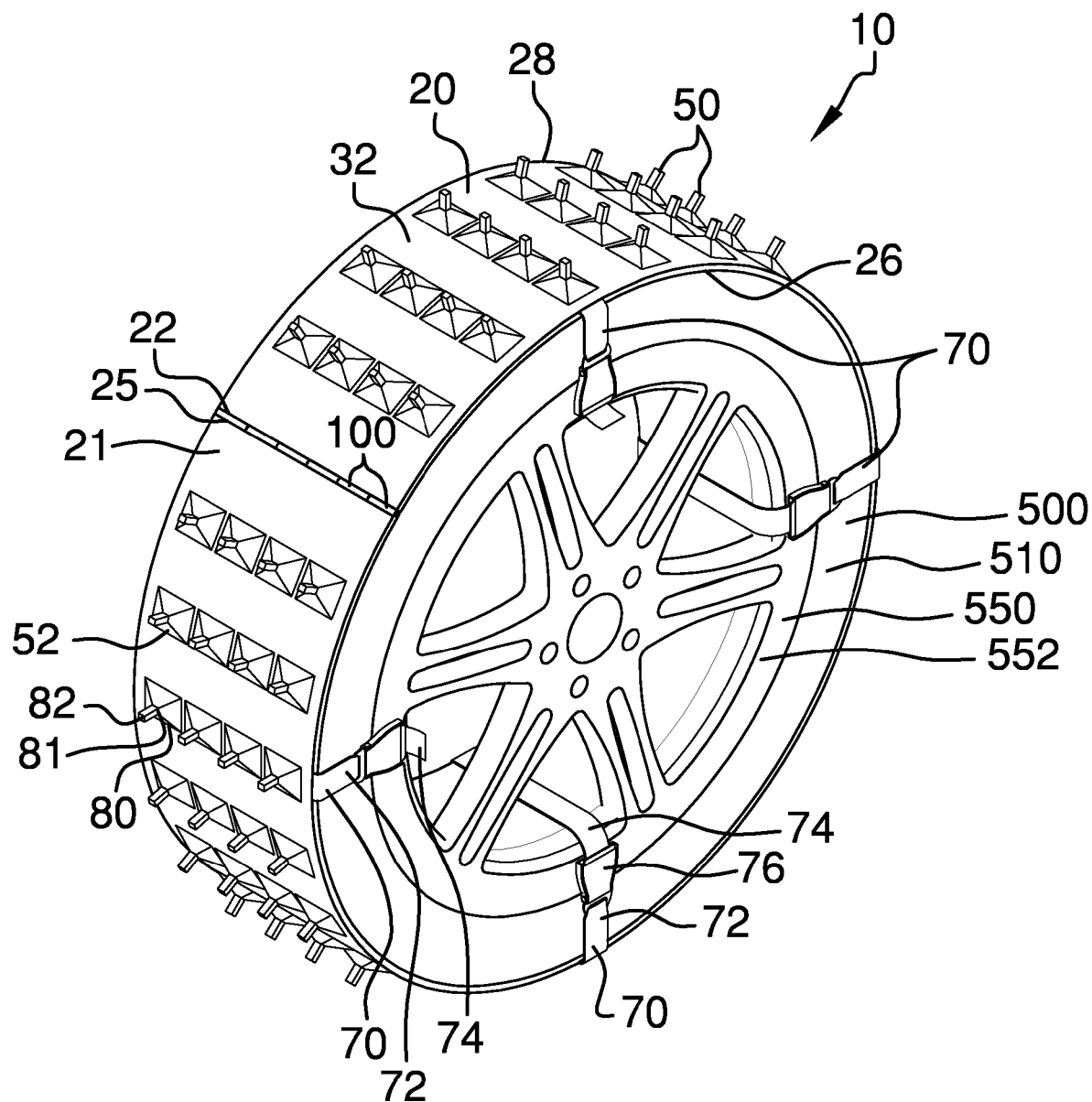
FIG. 1 is an isometric view.
Figure 2:
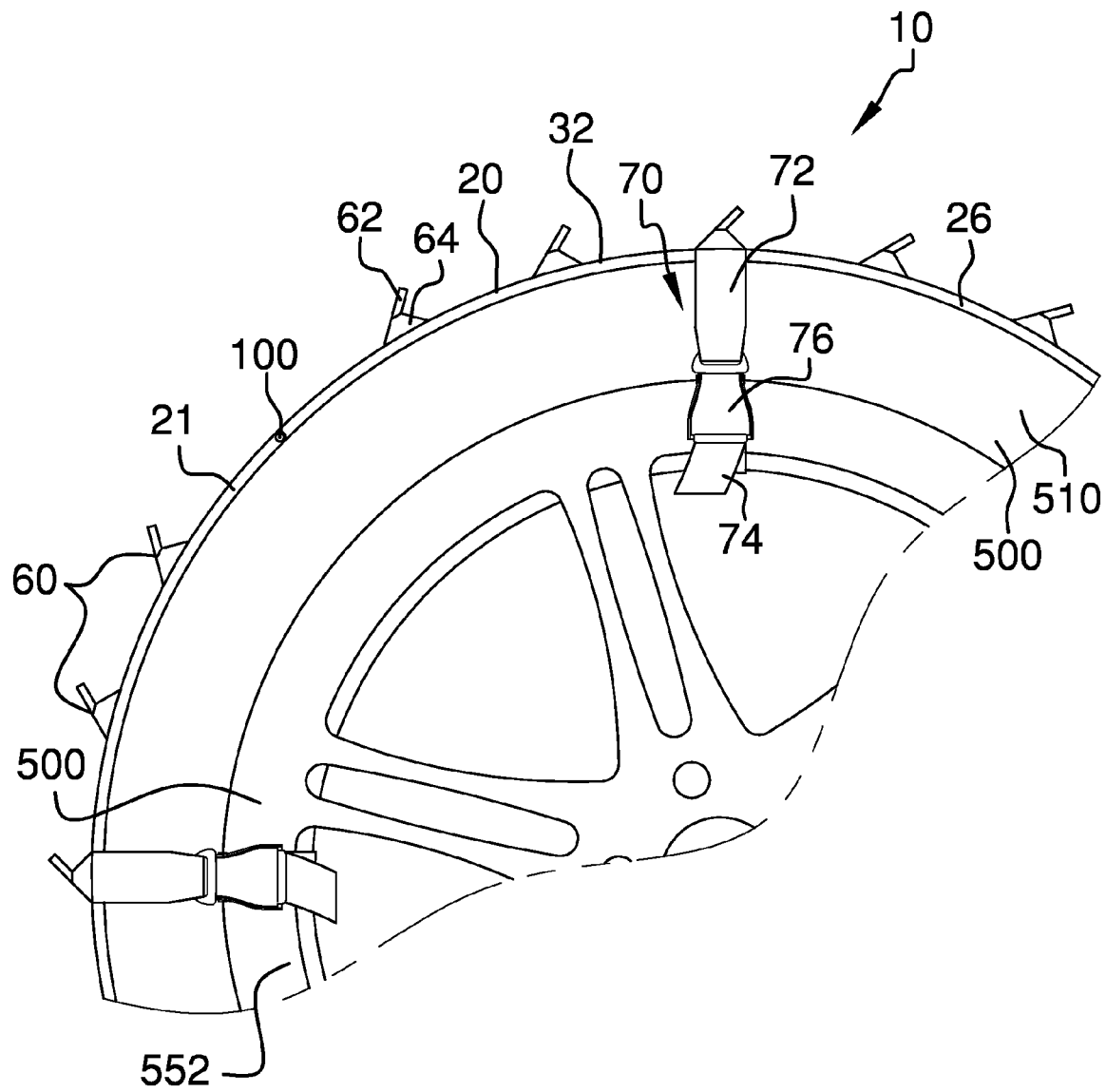
FIG. 2 is partial side view.
Figure 3A:
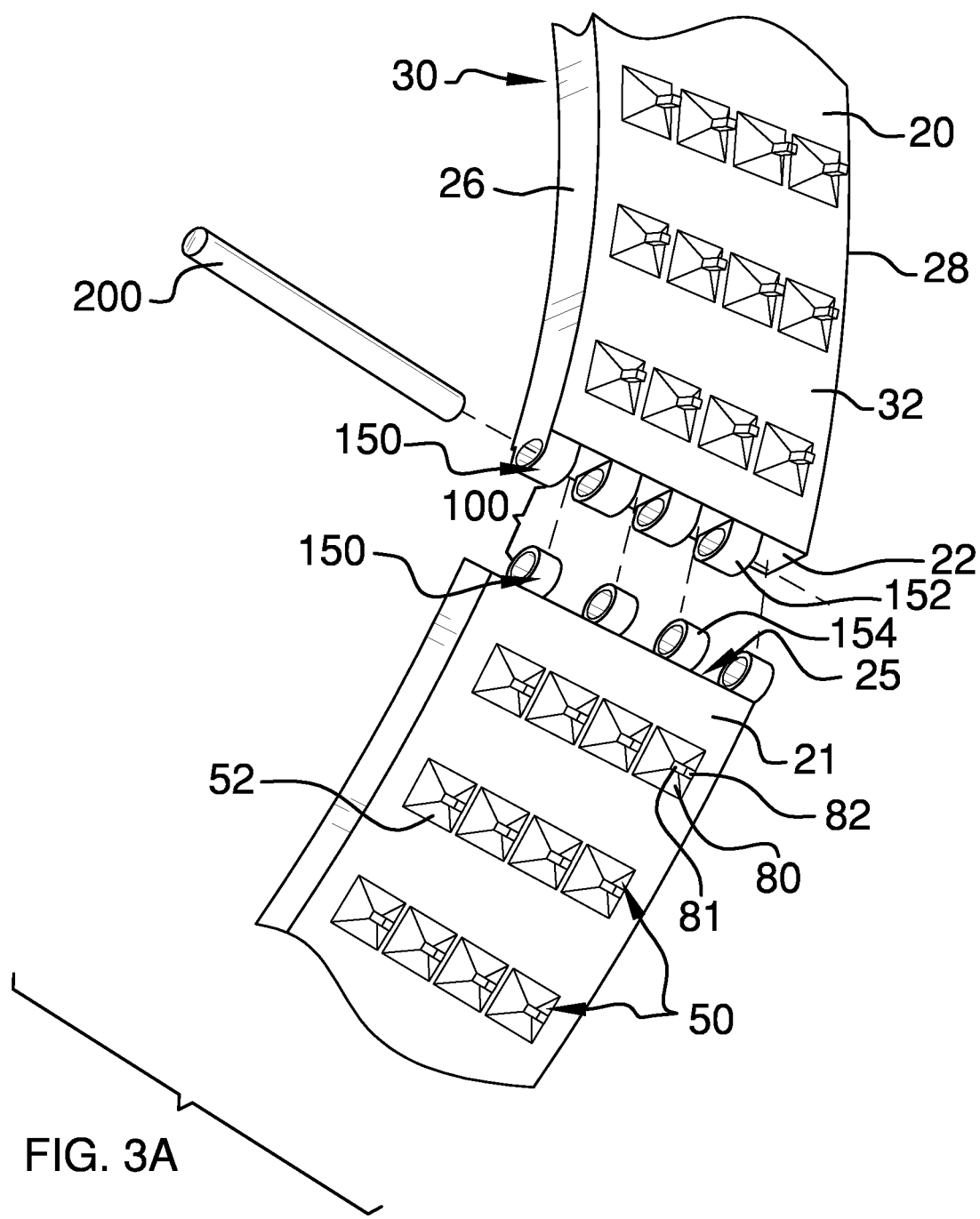
FIG. 3A is a detail view of the tire traction strip hinged joiner
Figure 3B:
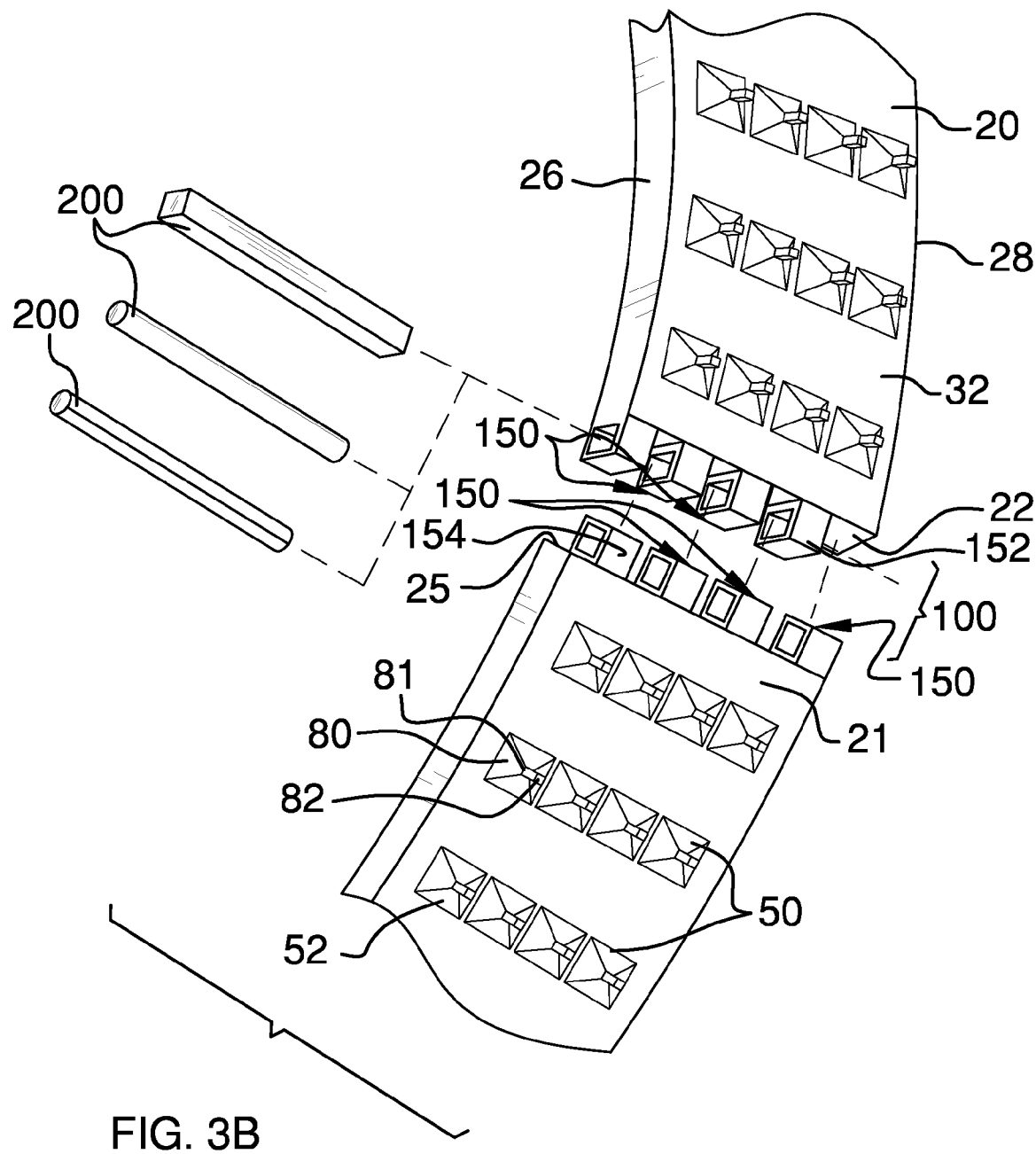
FIG. 3B is a detail view of additional embodiments of the hinged joiner and insertable pin.
Figure 4A:
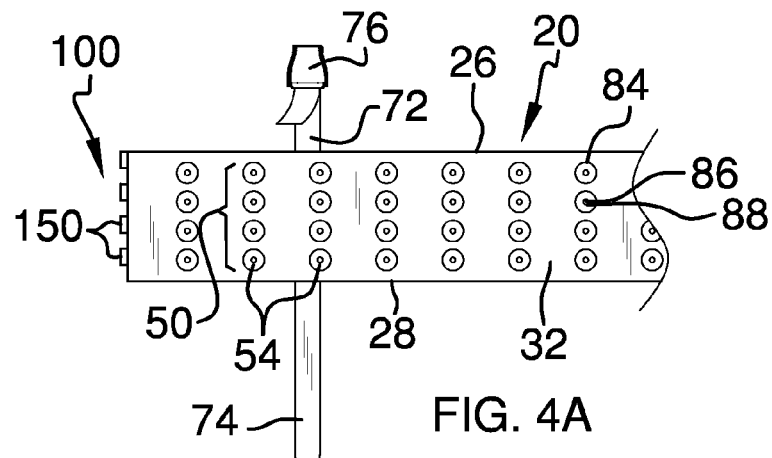
FIGS. 4A, 4B, and 4C are top views illustrating additional embodiments of the tire traction device tread.
Figure 4B:
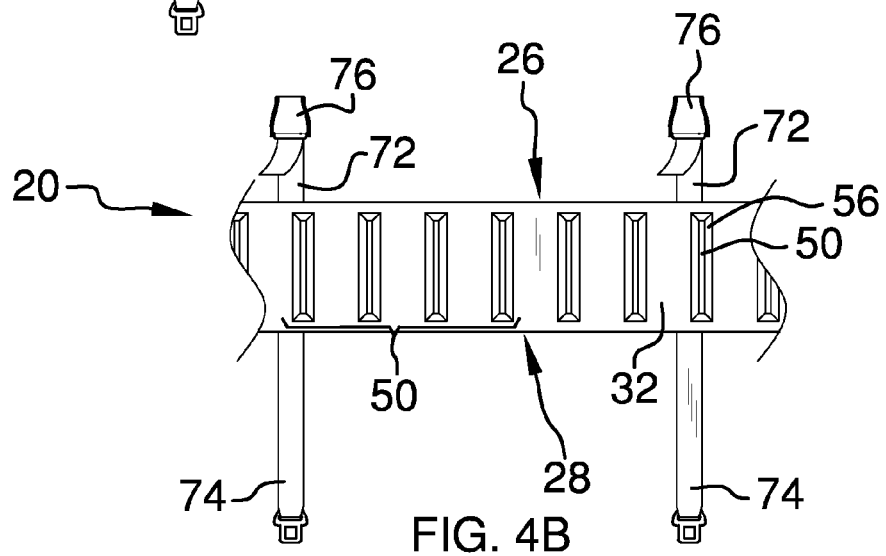
Figure 4C:
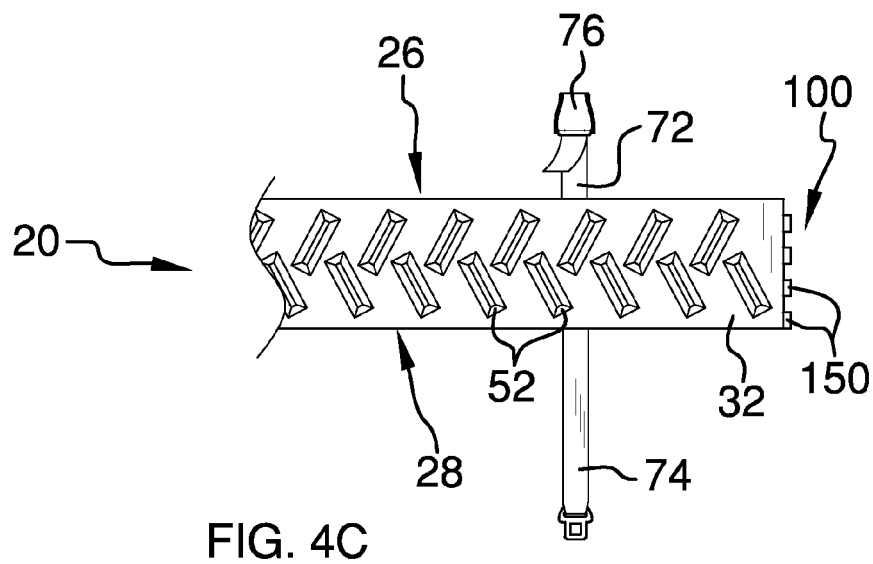

With reference now to the drawings, and in particular FIGS. 1 through 4C thereof, example of the tire traction device employing the principles and concepts of the present tire traction device and generally designated by the reference number 10 will be described.

Referring to FIGS. 1 through 4C a preferred embodiment of the present tire traction device 10 is illustrated.

The present tire traction device 10 comprises inter-attachable strips 20 of a polymeric material. Each strip 20 is a parallelepiped section of polymeric material having a front end 22, a rear end 24, an outward side 26, an inward side 28, an interior surface 30 and an exterior surface 32. A repeating tread assembly 50 protrudes from the exterior surface 30 of each strip 20.

Each strip 20 is inter-attachable via interlocking hinges 100 located at the strip 20 front 22 and rear 24 ends. The hinges 100 interlock by means of interspaced eyelets 150, with front eyelets 152 of a forward hinge 110 meshing with rear eyelets 154 of a rearward hinge 112 (see FIGS. 3A and 3B). An insertable pin 200 slides into the interspaced eyelets 150 securing the strip 20 front end 22 to an adjoining strip 21 rear end 25. Strips 20 are thusly secured together to conform to the circumference of the tread surface of a tire 500.

The tire traction device 10 is further secured to an automobile wheel 550 by belts 70, the belts having a buckle piece 72 and a thread piece 74. Each belt 70 buckle piece 72 is attached to the outward side 26 of each strip 20. Each belt 70 thread piece 74 is attached to the inward side 28 of each strip 20. The belt thread piece 74 is secured to the buckle piece 72 when inserted to an adjustable fastener 76. Each belt 70 is threaded through a rim 552 of an automobile wheel 550 and tightened when the thread piece 74 is fastened to the buckle piece 72 at the fastener 76. Each belt 70 tightly secures each strip 20 to the tire 500, the belt buckle 72 and thread 74 pieces stretching down opposing tire 500 sidewalls 510 to the wheel 550 rim 552. The thread piece 74 then interconnects through the rim 552 to the buckle piece 72 at the belt 70 fastener 76. The thread piece 74 is tightly secured to the buckle piece 72 by adjustment through the belt 70 fastener 76 as desired.

The tire traction device 10 here presented is envisioned with alternate tread assemblies 50. The tread assemblies 50 alternately include a circular tread 54, a straight tread 56, and an alternating tread 58 pattern as well as a ninety-degree tread 52 and an angled tread 60.

The ninety-degree tread assembly 52 includes a series of tetrahedral base members 80 disposed in parallel rows across the exterior surface 32 of each strip 20. Each tetrahedral base member 80 conjoins a parallelepiped tooth 82. Each tooth 82 is projected from each base member vertex 81 at a ninety-degree angle to the strip 20.

The circular tread assembly 54 includes a series of protruding conical members 84 conjoining cylindrical teeth 86, the teeth 86 projected outwardly from the conical member 84 vertex 88. The series of conical members 84 is disposed in parallel rows across the exterior surface 32 of each strip 20.

The straight tread assembly 56 includes a series of parallel right-prism members 90, oriented coaxially to the width of the strip, disposed across the exterior 32 of each strip 20.

The alternating tread assembly 58 includes a series of alternating right prism members 92 arranged in two rows, the rows disposed at an obtuse angle relative each other, across the exterior surface 32 of each strip 20.

The angled tread assembly 60 modifies a base member 64 with a vertex 62 inclined toward the direction of rotation of the strip 20.

The tire traction device 10 includes insertable pin 200 having varying shapes such as a parallelepiped, a cylinder, and a jointed cylinder.

The present device 10 is easily installed and removed to a vehicle wheel 550 when needed and is easily stored with not in use. The tread assembly 50 increases traction in contact with the road surface. The tire traction device 10 interior surface 30 conforms to the tire 500 minimizing wear to the tire 500 when the device 10 is used.

The device 10, once securely attached, is envisioned to allow faster travel over winter roads than is possible with chains.

What is claimed is:

1. A tire traction device comprising:
   a plurality of parallelepiped polymeric strips, each strip having a front end, a rear end, an outward side, an inward side, an interior surface and an exterior surface;
   a plurality of protruding tread assemblies horizontally disposed on each strip exterior surface;
   a forward hinge disposed at the strip front end;
   a rearward hinge disposed at the strip rear end;
   wherein each of the forward hinge and the rearward hinge comprises a plurality of interspaced interlocking eyelets;
   an insertable pin slidingly engaging the forward hinge eyelets and the rearward hinge eyelets;
   an adjustable belt member comprising:
   a buckle piece; and
   a thread piece;
   wherein the buckle piece attaches to the strip outward side;
   wherein the thread piece attaches to the strip inward side;
   wherein a fastener secures the buckle piece to the thread piece.

2. The tire traction device of claim 1 wherein the tread assembly comprises a series of tetrahedral base members conjoining parallelepiped teeth, the teeth projected upwardly from a vertex of each base member at a ninety-degree angle to the strip.

3. The tire traction device of claim 1 wherein the tread assembly comprises a series of protruding conical members conjoining cylindrical teeth, the teeth projected outwardly from a vertex of the conical member.

4. The tire traction device of claim 1 wherein the tread assembly comprises a series of parallel right-prism members, oriented coaxially to the width of the strip, disposed across the exterior of the strip.

5. The tire traction device of claim 1 wherein the tread assembly comprises a series of alternating right prism members arranged in two rows, the rows disposed at an obtuse angle relative each other across the exterior surface of each strip.

6. The tire traction device of claim 2 wherein the series of tetrahedral base members are disposed in parallel rows across the exterior surface of each strip.

7. The tire traction device of claim 3 wherein the series of conic base members are disposed in parallel rows repeating across the exterior surface of each strip.

8. The tire traction device of claim 4 wherein the right prisms have a vertex inclined at an acute angle pointing along a longitudinal axis of the strip.

* * * * *